Patented Aug. 19, 1952

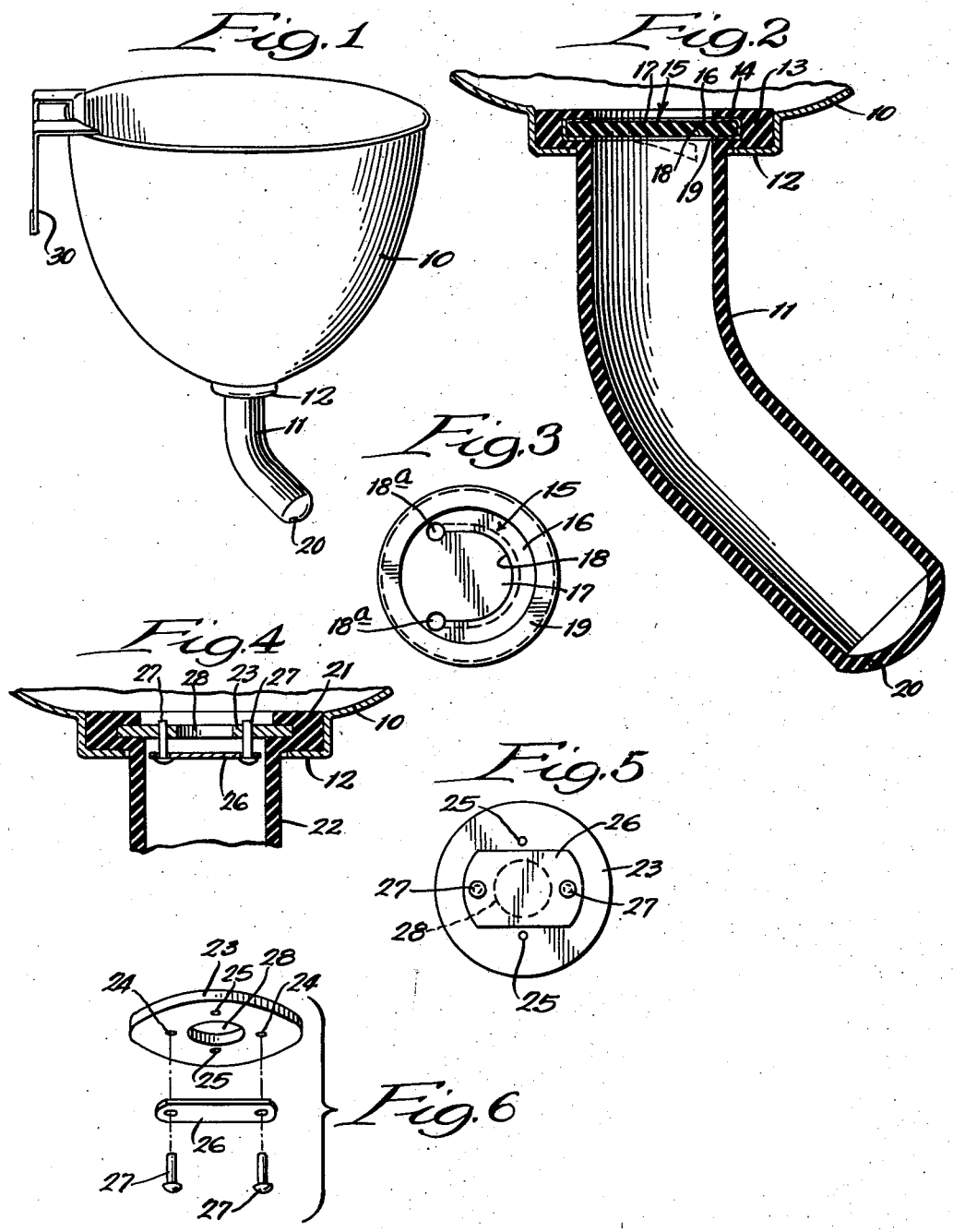

2,607,319

UNITED STATES PATENT OFFICE 2,607,319

CALF FEEDING DEVICE

Jonathan Shappee, Chicago, Ill., assignor to Armour and Company, Chicago, Ill., a corporation of Illinois Application February 18, 1950, Serial No. 145,021

6 Claims. (Cl. 119—71)

1

This invention relates to apparatus for feeding milk or semi-liquid food supplements to calves or other young animals.

In the feeding of various liquid foods, it is extremely important that the liquid be stirred in order to keep the materials in the liquid uniformly suspended in each portion of the liquid being fed. It is desirable to stir the contents of the container while the calf, etc., is feeding, but this operation if by hand requires too much time and limits the effective feeding simultaneously of a large number of calves, etc.

There has long been a need of means which could be operated automatically or through the feeding movements of the calf, etc., for bringing about the stirring of the contents of the container.

An object of the invention is to provide a container and feeding device associated therewith for effectively feeding the material to the calf while producing counter-movements of the liquid to stir the contents of the container during the feeding operation. A further object is to provide an improved container and feed apparatus accomplishing the above and other results. A still further object is to provide a calf-feeding device of simple and novel construction having the advantages and new results which will be described more in detail hereinafter.

The invention is shown in illustrative embodiments by the accompanying drawing, in which:

Figure 1 is a perspective view of a container and feeding device embodying my invention; Fig. 2, a broken enlarged vertical sectional view; Fig. 3, a top plan view of the valve member which may be employed; Fig. 4, a view similar to Fig. 2 but showing a modified form of the invention; Fig. 5, a top plan view of the valve member employed in the structure shown in Fig. 4; and Fig. 6, an exploded perspective view of the parts of the valve shown in Fig. 4, the parts being shown in separated relation.

In the illustration given 10 designates a container which may be of any suitable shape or type. I prefer to employ an elliptically-shaped pail, as illustrated in Fig. 1, to the bottom of which is attached a resilient or flexible teat 11 for delivery of the liquid food to the calf, etc. The bottom portion of the container 10 is preferably provided with an annular recessed portion 12 receiving the bead 13 of the teat 11.

In the embodiment of the invention illustrated, the bead 13 of the teat is provided with a laterally-extending groove or recess 14 adapted to receive the valve member 15. In the specific illustration given, the valve 15 consists of a rubber disk 16 having a slit therein formed at a bias, as indicated at 18 in Fig. 2. The slit forms a valve tongue 17, as illustrated in Fig. 3, and at the end of the slit are the two apertures 18$^a$. If desired, the resilient member 16 may be provided with a metal border or frame 19, which extends around the edge thereof.

While the rubber or resilient teat 11 may be of any suitable shape, I prefer the shape shown in which the center of the teat is curved so as to have a 30° to 45° angle about in the center of the nipple. The lower end of the teat is provided with a discharge port 20.

In the modification shown in Figs. 4 to 6 inclusive, the container 10 is the same and the recess 12 thereof receives the bead 21 of a teat or nipple 22. The bead 21 is recessed to receive a valve plate 23. The valve plate 23, as shown best in Fig. 6, is provided with the pin openings 24 and with the small liquid passages 25. A valve disk 26 is slidably mounted upon the pins 27, as shown in Fig. 4, and the disk when in upper position seals the central flow passage 28 of the plate 23. However, the disk 26 does not seal the small flow passages 25.

Operation

In the operation of the structure shown in Figs. 1 to 3, inclusive, the calf, etc., applies pressure with its mouth to the teat 11, forcing liquid within the teat outwardly through the outlet 20 into the calf's mouth. At the same time there is exerted an upward pressure of the liquid against the valve 17, but the valve does not permit the liquid to flow back into the container by reason of the bias line 18, as illustrated at Fig. 2. However, the two small openings 18$^a$ do permit a small jet of the milk or other liquid to be forced back into the pail so as to churn the contents of the pail. Thus in every contraction or collapsing of the teat, there are small jets of the liquid at spaced points directed back into the contents of the pail to stir and to keep the contents of the pail uniformly mixed.

In the illustration given in Figs. 4 to 6, inclusive, the collapsing of the nipple forces liquid upwardly, causing the disk 26 to rise against the valve plate 23 and to seal the central opening 28 thereof. However, the small passages 25, as shown in Fig. 5, are not sealed by the disk 26, and jets of liquid pass upwardly through these passages and into the body of the liquid within the pail. By closing off the main passage 28, the pressure of the liquid is utilized to its highest extent as a stirring agent, because the jets passing through the small passages 25 are impinged upon the liquid body under relatively heavy pressure, and bring about an effective mixing of the contents. Such small openings which give rise to these jets, however, do not interfere with the flow of the main body of the milk or other liquid within the teat into the mouth of the calf, etc.

If desired, the container 10 may be equipped with a supporting bracket 30 so that the container may be supported upon a rail or other support for the feeding of the calves and without requiring the presence of the operator. The specific structure shown represents a preferred apparatus, but the details of construction, shape, size, material, etc., may be varied as desired.

While in the foregoing specification I have set forth two particular structures in considerable detail for the purpose of illustrating embodiments of the invention, it will be understood that such details of structure may be varied widely by those skilled in the art without departing from the spirit of my invention.

I claim:

1. In a liquid feeding device comprising a container and a resilient teat secured thereto, a valve plate interposed between the top of the teat and the contents of the container, said plate having a main passage therethrough, a movable valve permitting the flow of liquid from the container into the teat, but sealing to prevent flow from the teat into the container when the teat is compressed, said valve plate having at least one small opening therethrough to pass a jet of liquid from the teat back into the container to agitate the contents thereof when the teat is compressed.

2. In a liquid feeding structure comprising a container and resilient teat secured thereto, a valve member between the upper portion of said teat and said container, said valve member having a main passage therethrough and spaced jet passages, and a valve effective upon the collapsing of the teat for closing said main passage to prevent the flow of liquid back into the container while leaving unclosed said jet passages.

3. In a liquid feeding apparatus, a container having an outlet in its bottom, a teat secured to said container and communicating with said outlet, said teat having an opening in the lower end thereof, and a valve member in the upper end thereof, said valve member consisting of a closure provided with a central opening and spaced lateral openings, said main opening being larger than said lateral openings, a valve controlling said main opening to provide back flow of liquid into the container when said teat is compressed, but being ineffective to prevent the back flow of liquid through the lateral passages into the container.

4. In combination, a semi-elliptical pail having an opening in the lower pointed end thereof, a teat provided with a flange secured within the lower end portion of said pail and communicating with the interior thereof, a valve member between the upper end of said teat and the container, said valve member comprising a closure wall having an opening therethrough and having small openings spaced laterally of said first-mentioned opening, and a check valve controlling said main opening and permitting the flow of liquid from said container into the teat, but preventing back flow of liquid into said container from said teat when said teat is compressed.

5. A resilient teat adapted to be secured to the outlet portion of a pail, and comprising a resilient teat body bent near its central portion at an angle of about 30° to 45°, and provided at its bottom with an outlet opening, a closure member in the upper end of said teat and provided with a main passage therethrough and with smaller spaced passages laterally of said main opening, and a check valve controlling said main opening and permitting the flow of liquid from said container into said teat, but preventing back flow of liquid from said teat into said container when the teat is compressed.

6. A resilient teat adapted to be secured to the outlet portion of a pail, and comprising a resilient teat body provided at its closed end with a slit and at its upper end with a flange adapted for attachment to the pail, a plate closing the upper end of said teat and provided with a large opening therethrough and with a small opening disposed laterally of said large opening, and a check valve controlling said large opening only, said lateral opening remaining open irrespective of the position of said valve.

JONATHAN SHAPPEE.

REFERENCES CITED

The following references are of record in the file of this patent:

UNITED STATES PATENTS

| Number | Name | Date |
|---|---|---|
| 670,823 | Swope | Mar. 26, 1901 |
| 2,190,420 | Frederick et al. | Feb. 13, 1940 |
| 2,350,215 | Christensen | May 30, 1944 |

FOREIGN PATENTS

| Number | Country | Date |
|---|---|---|
| 220,075 | Great Britain | Aug. 11, 1924 |